(No Model.) 7 Sheets—Sheet 1.

J. BLAKEY.
LASTING MACHINE.

No. 519,755. Patented May 15, 1894.

WITNESSES:   INVENTOR:

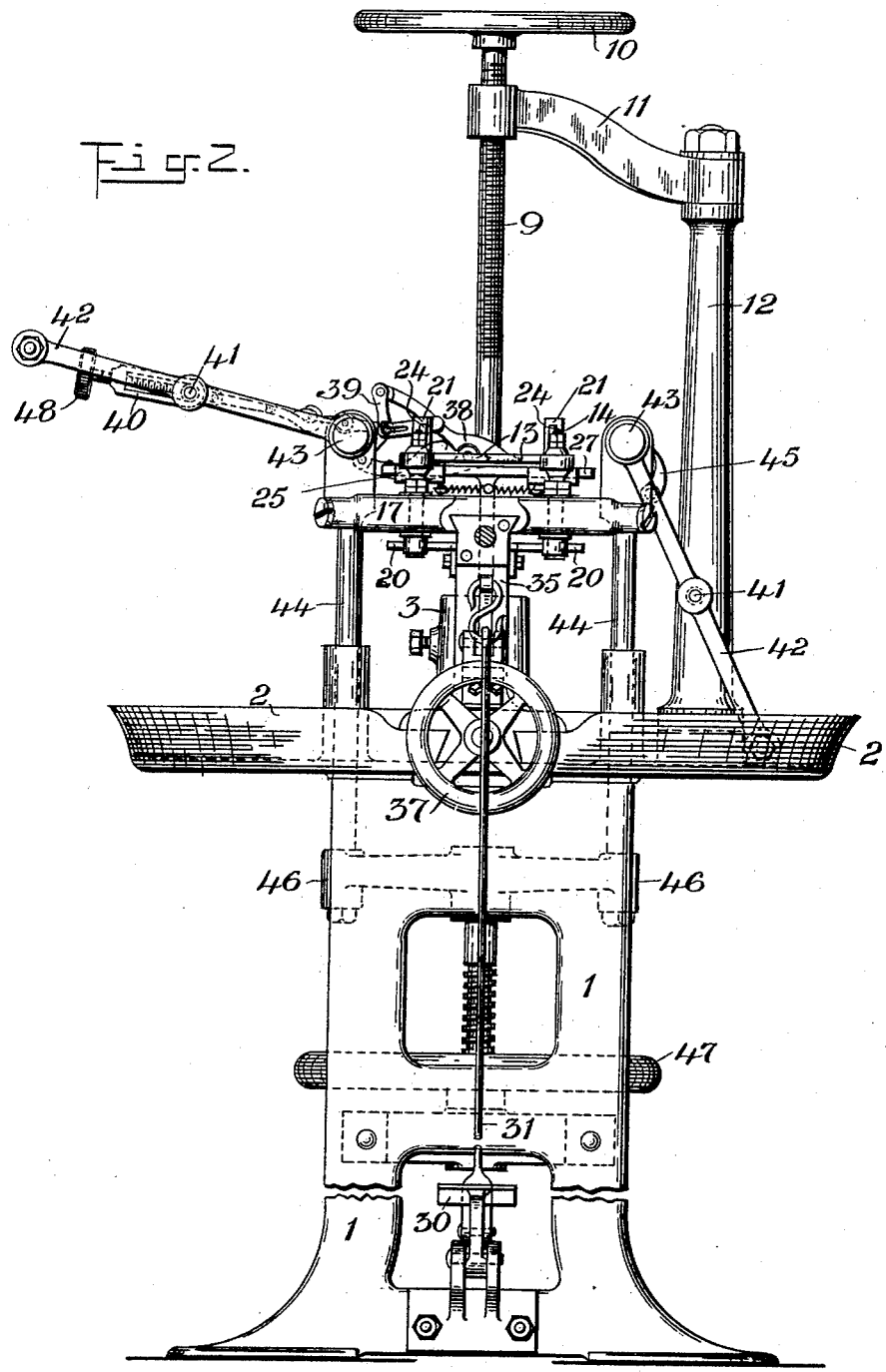

(No Model.) 7 Sheets—Sheet 3.
J. BLAKEY.
LASTING MACHINE.
No. 519,755. Patented May 15, 1894.
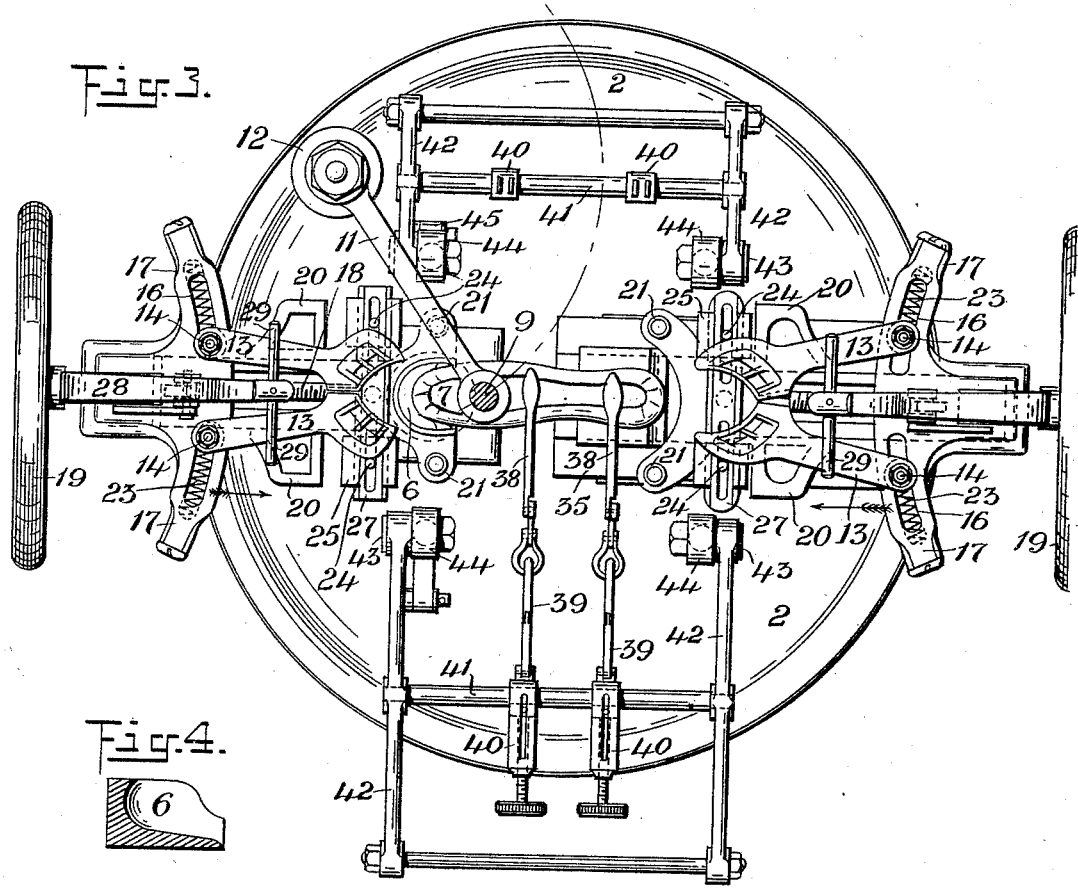
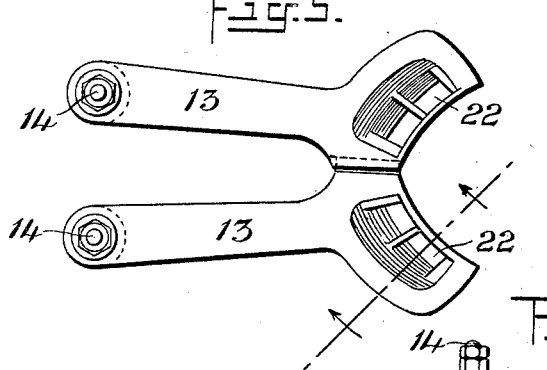
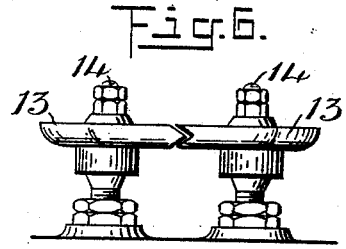
WITNESSES:
Arthur B Crossley
William H. Tempest.
INVENTOR:
John Blakey (No Model.) 7 Sheets—Sheet 4.

J. BLAKEY.
LASTING MACHINE.

No. 519,755. Patented May 15, 1894.

WITNESSES:

INVENTOR:
John Blakey (No Model.)
J. BLAKEY.
LASTING MACHINE.
No. 519,755.
7 Sheets—Sheet 5.
Patented May 15, 1894.
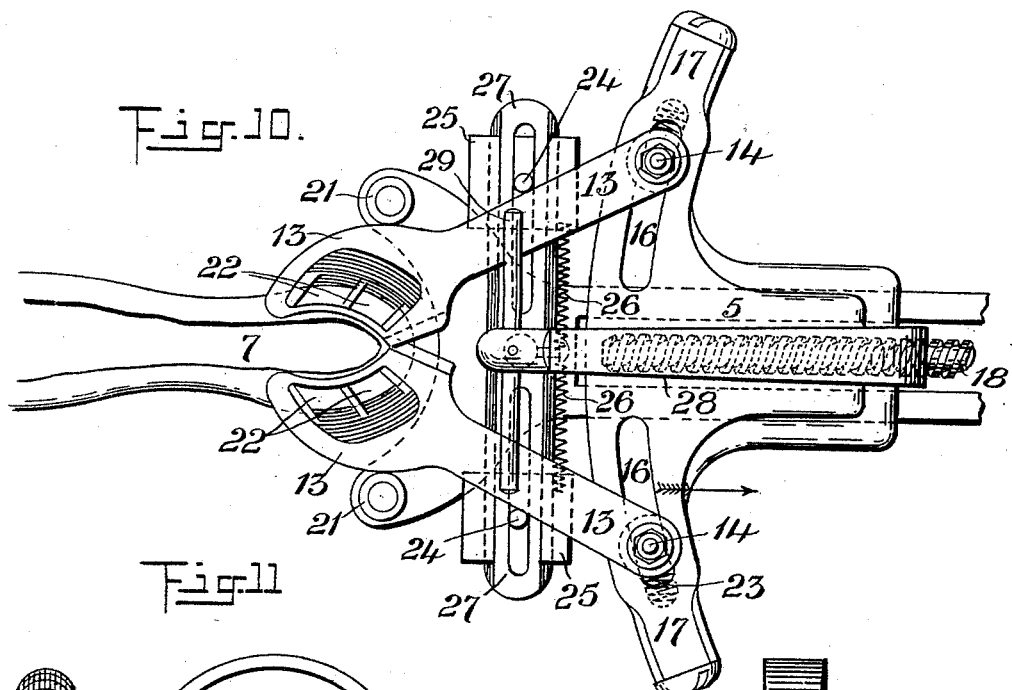
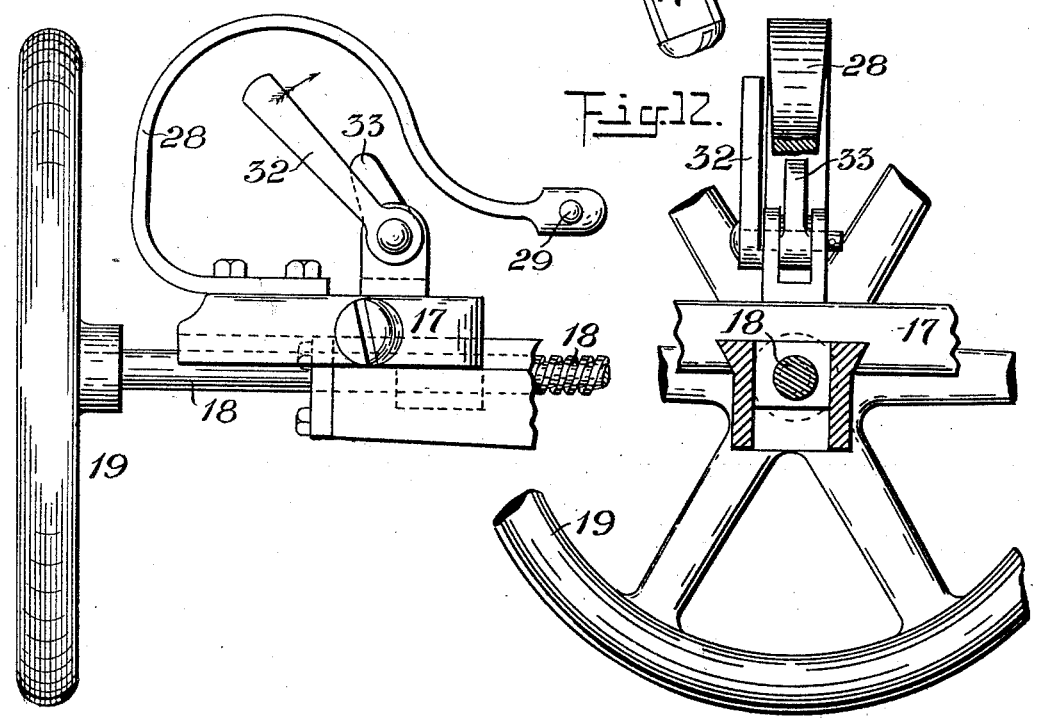
WITNESSES:
INVENTOR:
John Blakey

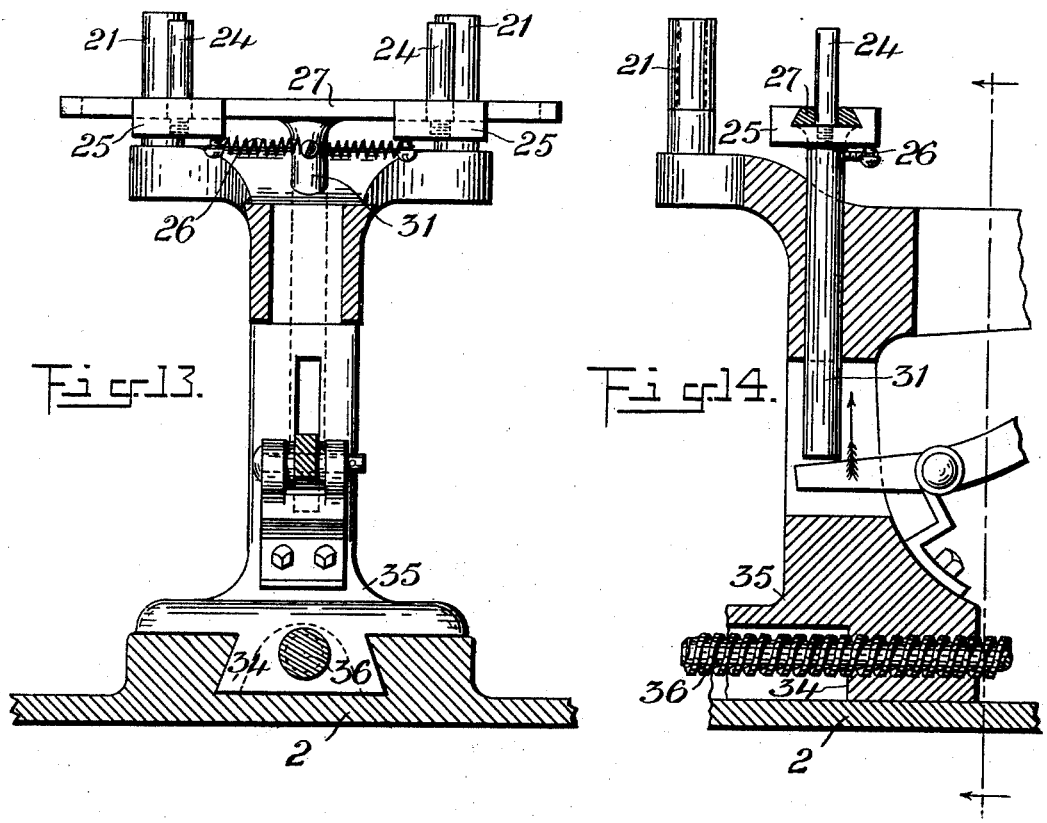

(No Model.)  J. BLAKEY.  7 Sheets—Sheet 7.
LASTING MACHINE.
No. 519,755. Patented May 15, 1894.
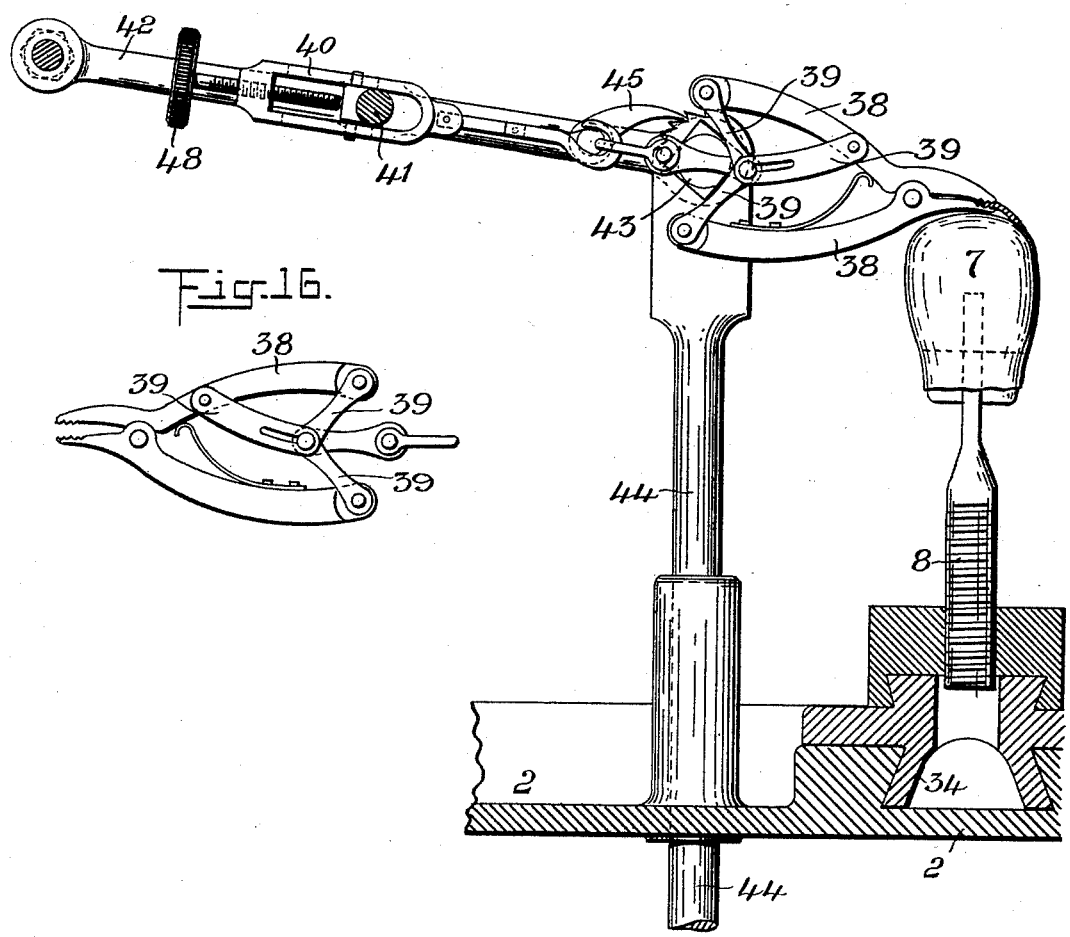
WITNESSES:
INVENTOR:

UNITED STATES PATENT OFFICE.

JOHN BLAKEY, OF LEEDS, ENGLAND.

LASTING-MACHINE.

SPECIFICATION forming part of Letters Patent No. 519,755, dated May 15, 1894.

Application filed December 11, 1893. Serial No. 493,355. (No model.)

*To all whom it may concern:*

Be it known that I, JOHN BLAKEY, a subject of the Queen of Great Britain, residing at Leeds, in the county of York, England, have invented certain new and useful Improvements in Machinery for Lasting Boots and Shoes; and I do hereby declare the following to be a full, clear, and exact description of the invention, such as will enable others skilled in the art to which it appertains to make and use the same.

This invention has reference to an improved arrangement and construction of apparatus for "lasting" boots and shoes.

In order that my invention may be better understood, reference is made to the accompanying sheets of drawings, wherein—

Figure 1:
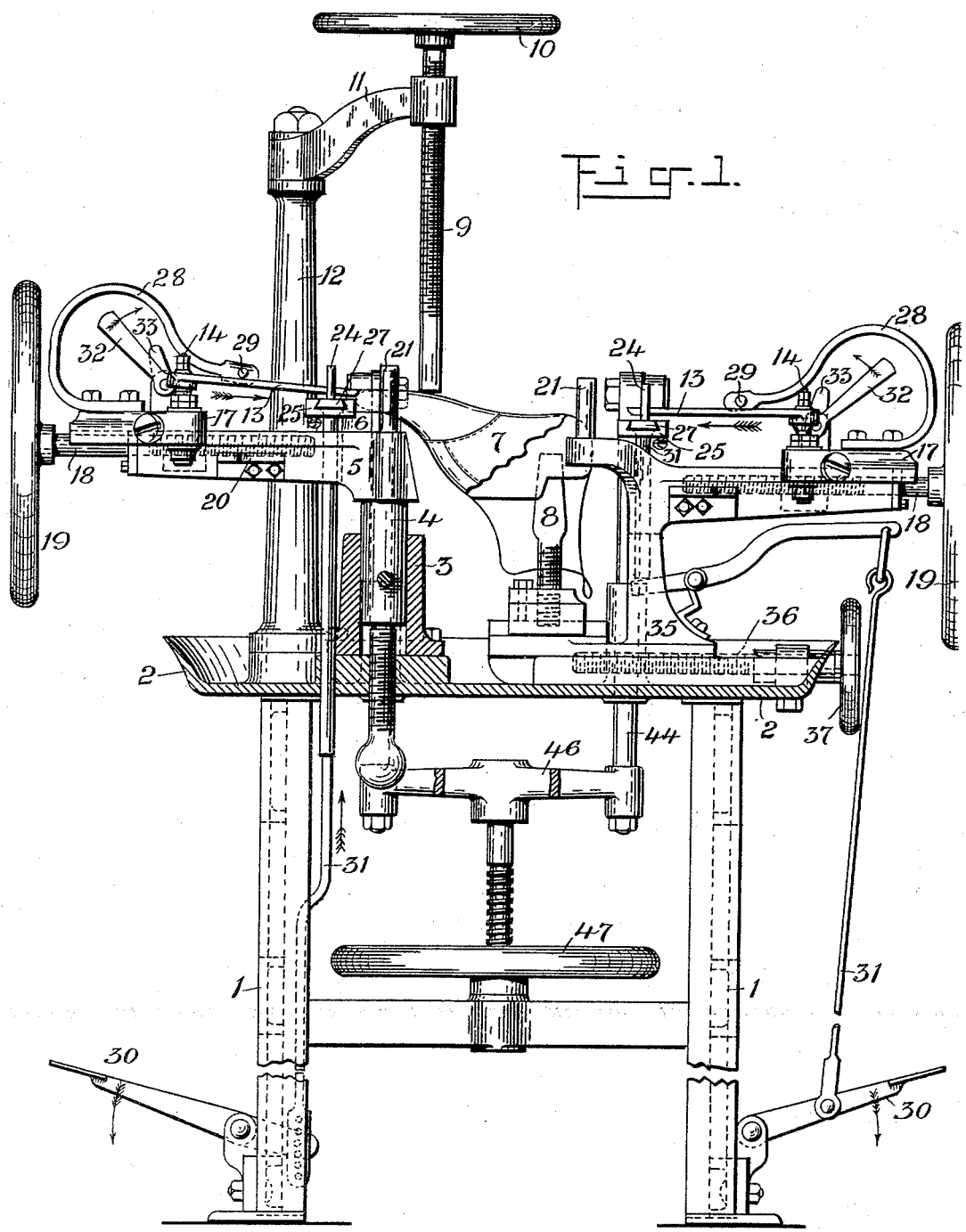
Figure 8:
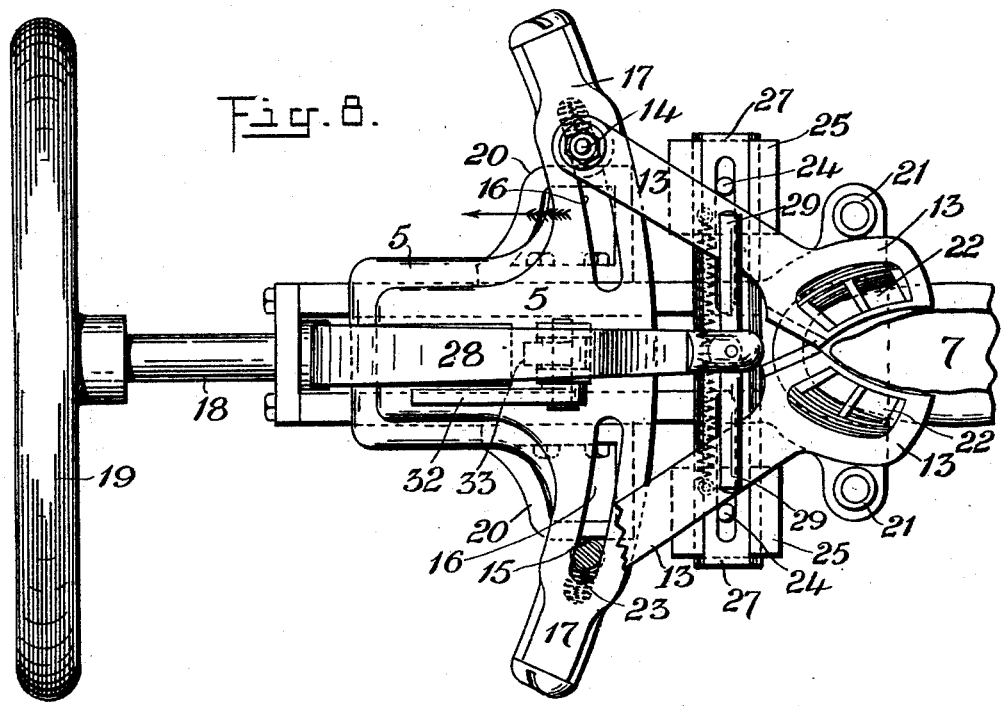
Figure 9:
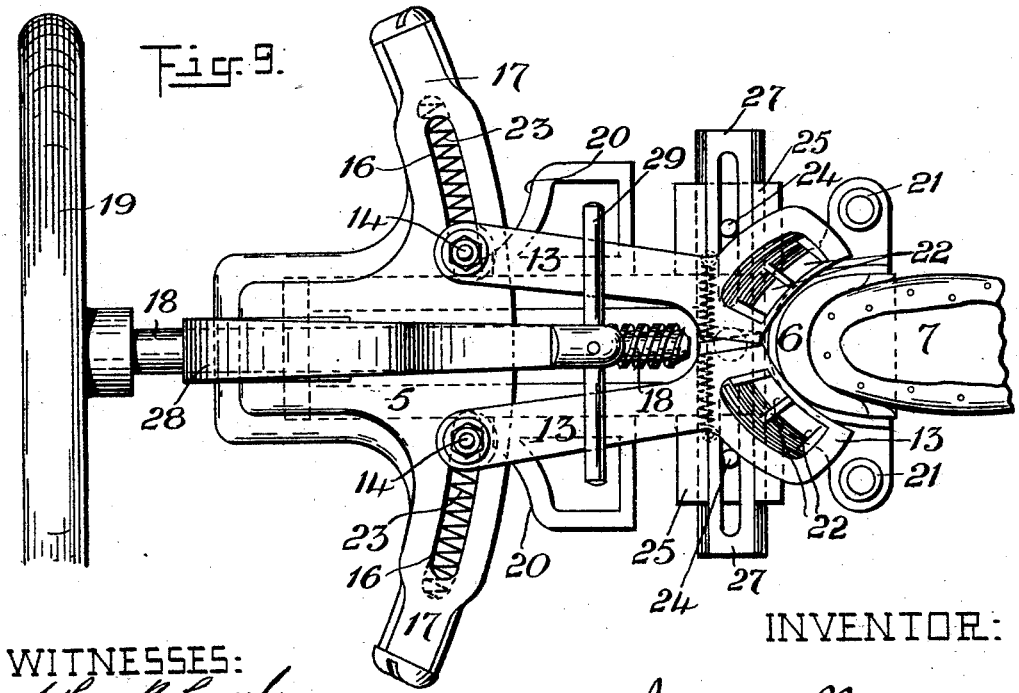

Figure 1 is a front elevation, partly in section, of my improved "lasting" machine. Fig. 2 is an end elevation of same and Fig. 3 is a plan view. Fig. 4 is a longitudinal section through the toe cup. Figs. 5, 6 and 7 are, respectively, a plan, an end view, and a sectional elevation of the fringe jaws 13. Figs. 8, 9 and 10 are plan views of the fringe jaws and the mechanism for operating them. Fig. 11 is a side view of the spring 28, hand wheel 19, and their supports. Fig. 12 is an end view of the same, partly in section. Figs. 13 and 14 are, respectively, a cross-section, and a sectional elevation of the parts by which the studs 24 and rod 31 are supported and operated. Figs. 15 and 16 are side views of the pinchers 38 and the devices for supporting and operating them.

1 represents the standards of the machine upon which is fixed a table 2. Rising up from this table is a socket 3 in which is an adjustable pillar 4 for carrying a horizontal bracket 5 which holds the toe cup 6 (shown in detail Fig. 4) for receiving the toe of the last 7 supported upon a pivot 8. The toe of the last is forced into the cup and held secure therein by means of a screw 9 and hand wheel 10, the said screw and hand wheel being carried by the bracket 11 which is supported by the pillar 12 upon the top of which it is capable of oscillating so as to be put on one side when the last is being removed from its position and a fresh one put in its place. The fringe of the upper is forced over the toe of the last for the purpose of being secured by nails by a pair of jaws 13 shown detached on an enlarged scale at Fig. 5, end view at Fig. 6 and sectional elevation at Fig. 7. These jaws are free to work upon studs 14 which carry small rollers or bowls 15 shown in Fig. 8. These studs with their bowls upon them work in radial slots 16 (see Fig. 8) formed in the adjustable plate 17, on the under side of which plate is a nut through which passes the screw 18 so that on the hand wheel 19 being operated in a forward direction the jaws 13 come into contact with the fringe of the upper, and as the said jaws advance by the continued motion of the hand wheel the fringe of the upper is forced with great pressure over the toe of the last. Fig. 9 shows the jaws in their normal position but on the hand wheel 19 being operated the said jaws are forced over the fringe of the upper as shown in Fig. 8. These jaws are closed or brought nearer together as they advance over the toe of the last in the following manner viz:—On the jaws 13 being forced forward by the hand wheel 19 the bowls 15 which are lying in the slots 16 come into contact with cam surfaces 20 attached to the sides of the plates 5, and as the jaws advance the cam surfaces cause the pivoted ends of the jaws to open out and the inner end to close up as shown in Fig. 8, the effect of which is to force the fringe of the upper over the toe of the last, this closing of the inner end of the jaws being assisted by the bowls 21 against which the outside of the jaws ride, and when the jaws are in the position shown in Fig. 8 the operative makes the upper fast by nails, certain openings or perforations 22 in the jaws being formed for that purpose. It will be obvious that when the jaws have forced the leather over the last the operative will have his hands free and be able to drive the nails into the leather the perforations 22 in the jaws permitting him to do this. As soon as the upper has been secured the motion of the hand wheel 19 is reversed and the jaws withdrawn. The spiral springs 23 within the slots 16 draw the pivoted ends of the jaws together, and so open the inward end, the opening of the rear ends of the jaws being further assisted by means of two vertical studs 24 fixed in slides 25, which slides are connected together by a spiral spring 26, the two slides being free to move backward and forward on the dovetailed bar 27. The pressure of the jaws upon the toe of the last is effected by the bent spring 28 which carries a horizontal cross bar 29 each end of which bar rests upon each jaw 13 as clearly shown in plan views Figs. 3, 8, 9 and 10. Pressure of the jaws upon the toe of the last can however be removed by the operative placing his foot upon the treadle 30 connected to the bottom of the vertical rod 31 on the top of which is the dovetailed bar 27, and it is upon this dovetailed bar that the end of the jaws rest, so that when pressure is put upon a small hand lever 32 in the direction of the arrow shown in Figs. 1 and 11 the movement of the said lever will bring a cam 33 underneath the bent spring, and so lift the pressure of the cross bar 29 from off the jaws.

I would here remark that the pivoted ends of the jaws 13 are not only capable of opening and closing horizontally but that the joint is partially a ball joint to permit a slight upward and downward movement of the said jaws when they are either forced upon the toe last or removed slightly from it.

The method of forcing the fringe of the upper over the heel of the boot is similar to that which has been described with reference to the toe, the parts of mechanism employed and the method of operation being the same with this difference that the toe cup holder 5 while it has an upward and downward motion vertically to suit different heights of lasts it has no horizontal movement, but the parts for operating upon the heel of the boot are made to have a horizontal movement, and this is effected by means of a nut 34 formed in the bottom of the standard 35 (see enlarged details Figs. 13 and 14.) Through this nut passes a screw 36 provided with a hand wheel 37 which on being operated causes the standard 35 to advance nearer the toe mechanism or farther from it, the bottom of the standard being dovetailed and working in a dovetailed groove formed in the top of the table 2.

So far I have described the mechanism I employ for forcing the fringe of the upper over the toe and heel of the last, but I will now describe the mechanism I employ for pulling the fringe of the upper over the inner sole of the last, and for this purpose I employ two pairs of pinchers 38 arranged at each side of the last shown on an enlarged scale at Figs. 15 and 16. These pinchers are connected by a series of links 39 to a yoke or slotted part 40. Within the yoke is a cross bar 41 connected to two lever arms 42 mounted upon studs 43 on the top of vertical rods or pillars 44. These lever arms 42 are free to oscillate upon their studs and when the pinchers 38 have seized hold of the fringe of the upper, the said lever arms are drawn downward, the effect of which is, through the intervention of the several links 39 to close the pinchers so as to get tightly hold of the fringe of the upper, and on the lever arms being forced downward the leather is pulled over the last and stretched tightly thereon, the said lever arms being held or retained in a suitable degree of tightness by a pawl 45 taking into one of a series of teeth formed on the top of one of the pillars 44. Thus when the upper is stretched in the manner just described and the lever arms held by the pawl 45 the hands of the operative are at liberty and he is enabled to drive in the nails so as to make the upper secure on the last. Two sets of pinchers 38 are arranged at each side of the machine for operating upon both sides of the upper and when the lever arms 42 are not in use they occupy the position shown in Fig. 16.

The machine herein shown and described can be adapted to stretch leather over lasts of different sizes as the machine is adjustable in all parts with the exception of the lateral movement of the toe mechanism. The uprights 44 which carry the pinchers are attached to radial arms 46 and they can be raised or lowered vertically by operating hand wheel 47. The stroke of the pinchers or extent of their movement can also be lengthened and shortened by the screw 48, while the mechanism for operating upon the heels of the last can also be made to advance or recede according to the length of last being used, all the various movements of adjustment being independent of each other.

I claim as my invention—

1. In a lasting machine, the combination, with the fringe-jaws 13, of the studs 14 pivotally engaging the rear ends of the said jaws and provided with rollers 15, the longitudinally adjustable plate 17 provided with curved slots 16 engaging the said rollers, a spring operating to press the jaws downward, and the stationary plate provided with cams 20 for the said rollers to bear against, whereby the inner ends of the jaws are closed up, substantially as set forth.

2. In a lasting machine, the combination, with the fringe-jaws 13, of the studs 14 pivotally engaging the rear ends of the said jaws and provided with rollers 15, the longitudinally adjustable plate 17 provided with curved slots 16 engaging the said rollers, a spring operating to press the jaws downward, the stationary plate 5 provided with cams 20 arranged in front of the said rollers, a nut secured to the plate 17, the screw 18 engaging with the said nut and operating to move the jaws back and forth, substantially as set forth.

3. In a lasting machine, the combination, with the fringe jaws 13, of the studs 14 pivotally engaging the rear ends of the said jaws and provided with the rollers 15, the longitudinally adjustable plate 17 provided with the curved slots 16 engaging the said rollers, the springs 23 for opening the jaws, the rod 31 provided with a bar 27, the slides 25 provided with studs 24 and engaging the said bar, the spring 26 connecting the two slides, the said studs 24 operating to press together the front ends of the jaws; and the stationary plate provided with cams 20 for the rollers 15 to bear against, substantially as set forth.

4. In a lasting machine, the combination, with the pinchers 38, and the pivoted links 39; of the yoke 40 operatively connected to the said links, the crossbar 41 passing through the yoke, a screw 48 for adjusting the position of the crossbar, the stationary pillars 44, and the lever arms 42 pivoted to the tops of the said pillars and having the said bar 41 connected to them, substantially as set forth.

5. In a lasting machine, the combination, with the pinchers 38, and the pivoted links 39; of the yoke 40 operatively connected to the said links, the crossbar 41 passing through the yoke, a screw 48 for adjusting the position of the crossbar, the stationary pillars 44, one of said pillars being provided with ratchet teeth at its top, the lever arms 42 pivoted to the tops of the said pillars and having the said bar 41 connected to them, and the pawl 45 pivoted to one of the lever arms and engaging with the said ratchet teeth, substantially as set forth.

In testimony whereof I affix my signature in presence of two witnesses.

JOHN BLAKEY.

Witnesses:
ARTHUR B. CROSSLEY,
WILLIAM H. TEMPEST,
*Both of Commercial Street, Halifax.*